United States Patent [19]

Sund

[11] Patent Number: 4,492,074
[45] Date of Patent: Jan. 8, 1985

[54] PICKUP ROLLER SPREADER

[76] Inventor: Lloyd P. Sund, Newburg, N. Dak. 58762

[21] Appl. No.: 564,892

[22] Filed: Dec. 23, 1983

Related U.S. Application Data

[63] Continuation-in-part of Ser. No. 516,472, Jul. 22, 1983.

[51] Int. Cl.³ .................. A01D 89/00; B65G 15/50
[52] U.S. Cl. .................... 56/364; 56/14.6; 198/814
[58] Field of Search ............ 56/14.6, 181, 185, 364, 56/122; 198/813, 814, 815, 816

[56] References Cited

U.S. PATENT DOCUMENTS

| 375,376 | 2/1887 | Mouck | 198/814 |
|---|---|---|---|
| 406,792 | 7/1889 | Steward | 198/814 |
| 469,293 | 2/1892 | Carver | 198/814 |
| 671,470 | 5/1901 | Colaman | 198/814 |
| 2,480,294 | 8/1949 | Hume | 198/814 |
| 3,514,937 | 6/1970 | Batog | 56/364 |
| 3,718,197 | 2/1973 | Barten et al. | 198/814 |
| 4,353,201 | 8/1982 | Pierce et al. | 56/364 |
| 4,362,005 | 12/1982 | Hanaway et al. | 198/814 |

FOREIGN PATENT DOCUMENTS 197709  3/1974  U.S.S.R. ................. 56/364

Primary Examiner—Gene Mancene
Assistant Examiner—John G. Weiss
Attorney, Agent, or Firm—Williamson, Bains, Moore & Hansen

[57] ABSTRACT

A grain pickup is designed for the picking up of windrowed grain for supply to a combine. One or more belts pass around two spaced parallel rollers which guide and propel the belt or belts. The rollers are supported and driven at either end by conventional equipment and in the center are supported by roller assemblies which are forced apart from one another and into the rollers so as to provide roller support and guidance. The roller assemblies can be loaded from the outside frame of the machine allowing adjustment of the preload on the rollers.

6 Claims, 5 Drawing Figures

PICKUP ROLLER SPREADER

RELATED APPLICATIONS

This application is a continuation-in-part of my application Serial No. 516,472, filed July 22, 1983.

BACKGROUND OF THE INVENTION

In general, belt-type grain pickups have been known and used for years. In general, such pickups consist of a pair of spaced apart rollers rotatably mounted and driven in end frames over which one or more belts pass to pick up the grain. For most efficient use, these rollers are one span which span the distance between the two end frames and are typically formed of hollow tubing. One problem which has resulted from such pickups is that in the event the pickup and combine hit a rock, this long unsupported span is susceptible to bending. If one or both rollers are bent, a substantial amount of down time is involved during the season which the farmer ideally wishes to utilize his equipment continuously. One solution to this problem has been to form the rollers out of larger diameter or thicker walled material. In addition to the obvious cost and weight implications of such an attempted solution, in particular providing a larger diameter roller yields a less effective pickup as the increased diameter places the top half of the belt higher above the ground and thus makes it somewhat more difficult for the pickup to gather the windrowed grain.

SUMMARY OF THE INVENTION

The general construction of the grain pickup is shown in more detail in the parent application Ser. No. 516,472. The contents of that application are herein incorporated by reference. In general, the pickup consists of two end frames having rollers rotatably mounted between the end frames. In addition, at least a pair of cross members span and connect the distance between the two end frames. In the instant invention, at least a pair of rollers are mounted on each cross member at approximately mid-span. Of course, if desired, more sets of rollers and supporting points may be supplied. These rollers are rollingly mounted so as to rollingly contact the back side of the belt rollers. A mechanism is supplied to springingly force the cross members away from one another adjacent the support roller assembly so as to force the support rollers into contact with the belt rollers thereby providing support in the event of inadvertent contact with rocks or other foreign objects. This tensioning may be accomplished by means of two links which connect the cross members adjacent the support rollers and which have a total combined length somewhat greater than the distance between the cross members. The juncture of these two links then runs parallel to the cross members outwardly whereupon it is mounted to the end frame. Ideally this mounting includes a spring which biases the linkage to provide the desired amount of pre-load in which the spring pre-load may be adjusted as desired.

These and other objects and advantages of the invention will appear more fully from the following description made in conjunction with the accompanying drawings wherein like reference characters refer to the same or similar parts throughout the several views.

DESCRIPTION OF THE DRAWING FIGURES

DESCRIPTION OF THE PREFERRED EMBODIMENT

Figure 2:
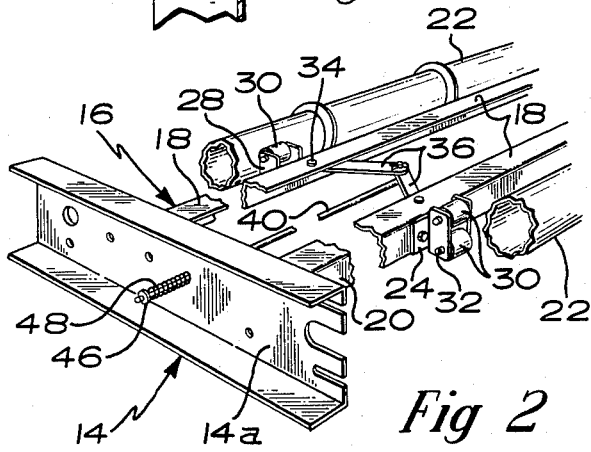
FIG. 2 is a perspective cutaway view showing the spreader attachment of the instant invention.

The pickup utilizing the instant invention is generally designated 10 and is mounted to the front end of a combine 12. The mounting details and general construction of pickup 10 is shown more fully in the above referenced parent application. In particular, pickup 10 is comprised of two channel-shaped end frames 14 having a center web 14a as shown particularly in FIG. 2. A pair of cross members 16 run from one end frame 14 to the other. Each cross member 16 is generally of a right angle shape and is comprised of a horizontal portion 18 and a vertical portion 20. A pair of belt rollers 22 are rotatably mounted in end frames 14. Again, the details of this mounting are shown in the above referenced parent application.

Figure 1:
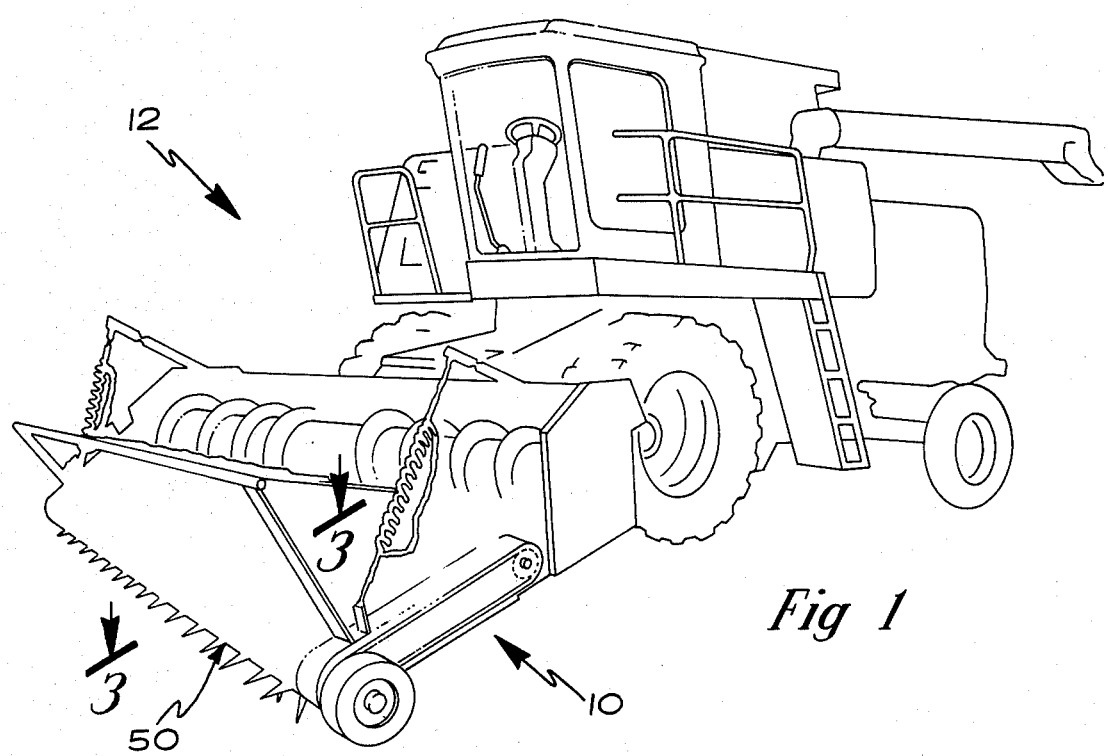
FIG. 1 is a perspective view showing the pickup of the instant invention mounted to the front of a combine.
Figure 4:
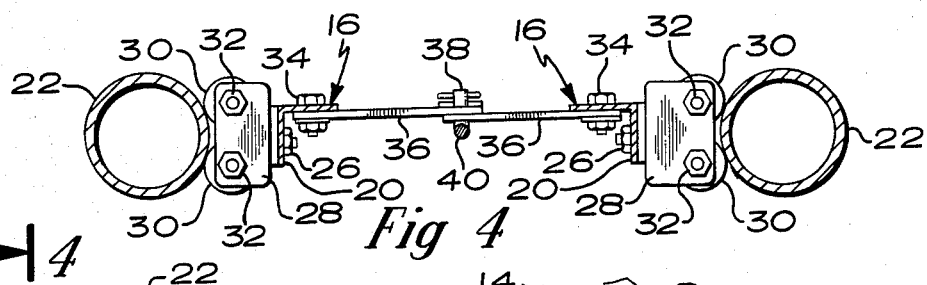
FIG. 4 is a sectional view taken along line 4—4 of FIG. 3.
Figure 5:
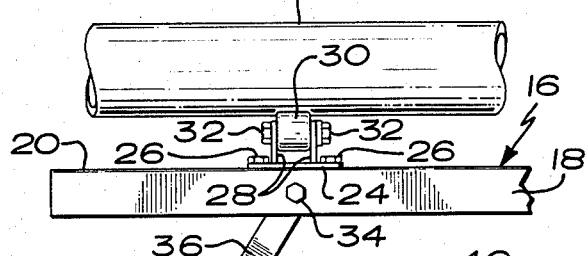
FIG. 5 is a detailed view showing the spring loading mechanism for the tensioning device of the instant invention.
Figure 5:
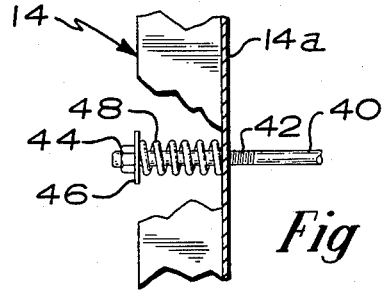
Figure 3:
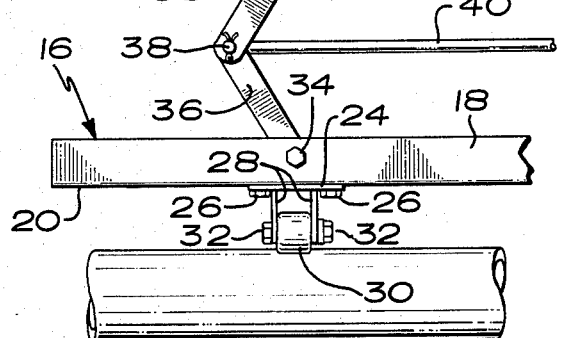
FIG. 3 is a sectional view taken along line 3—3 of FIG. 1.

A support roller mounting plate 24 is bolted to the vertical portion 20 of each cross member 16 at approximately the mid-point of cross member 16. Mounting plate 24 is fastened to vertical portion 20 by means of bolts 26. A pair of roller support plates 28 extend at right angles from mounting plate 24 toward belt roller 22. Plates 28 are fixed to mounting plate 24 by means of welding or other conventional methods. A pair of rollers 30 are mounted one above the other and serve to stabilize and lightly contact the back or underside of belt rollers 22. Support rollers 30 contact belt roller 22 on the portion which is not contacted by belts 50. Support rollers 30 are desirably formed of a material marketed under the name of Ryertex, which is an impregnated canvas material. Support rollers 30 are mounted on roller bolts 32 which pass through plates 28 as shown. A pair of bolts 34 are utilized to pivotally mount lever arms 36 to the horizontal portion 18 of cross members 16. The other ends of lever arms 36 are connected together and to tension rod 40 by means of pin 38 intermediate cross members 18. As can be seen particularly in FIG. 3, the combined length of lever arms 36 is greater than the distance between cross member 16. Thus, when tension rod is urged to the right in FIG. 3, cross members 16 are forced apart and support rollers 30 are forced into belt rollers 22 thereby providing substantial support and guidance for belt rollers 22. Tension rod 40 runs outwardly parallel to cross members 16 and terminates in a threaded portion 42 as shown in FIG. 5. Threaded portion 42 passes through end frame center web 14a and has placed thereover in serial relationship a spring 48, a washer 46 and a nut 44. Thus, it can be seen by varying the adjustment of nut 44, the pre-load tension of support rollers 30 on belt roller 22 may be varied. Such variance can also take place by varying the strength of spring 48.

It can be noted that adjustment of the pre-load tension of support rollers 30 may be accomplished easily and quickly from the outside of the machine with no need for disassembly of pickup 10 of any sort. It is also apparent that the invention shown and described is capable of being easily and quickly retrofitted to existing pickups in order to strengthen and provide support on existing machines.

While the preferred embodiments of the present invention have been described, it should be understood that various changes, adaptions and modifications may be made therein without departing from the spirit of the invention and the scope of the appended claims.

What is claimed is:

1. In a pickup having at least one belt running over first and second belt rollers, said belt rollers begin parallel to one another and rotatably mounted and extending between first and second end frames, said pickup further comprising first and second cross members parallel to and located between said belt rollers and running between said first and second end frames, the improvement comprising:
   at least two support rollers mounted on each said cross member intermediate said end frames in rolling relationship with a said belt roller; and
   means for forcing said cross members apart and said support rollers into said belt rollers.

2. The pickup of claim 1 wherein said forcing means comprises:
   a first link having first and second ends, said first link first end being pivotably attached to said first cross member adjacent said support rollers; and
   a second link having first and second ends, said second link first end being pivotably attached to said second cross member adjacent said support rollers, said second ends being pivotably attached to one another.

3. The pickup of claim 2 wherein the combined length of said first and second links is greater than the distance between said cross members.

4. The pickup of claim 3, said forcing means further comprising a loading link having first and second ends, said loading link first end being pivotably attached to said first and second link second ends.

5. The pickup of claim 5 wherein the length of said loading link extends substantially parallel to said cross members and termianting with said loading link second end adjacent said first end frame.

6. The pickup of claim 5, said forcing means further comprising means for applying a longitudinal load to said loading link second end relative to said first end frame.

* * * * *